United States Patent [19]

Tanaka et al.

[11] Patent Number: 4,613,154
[45] Date of Patent: Sep. 23, 1986

[54] VEHICLE SUSPENSION APPARATUS

[75] Inventors: Tadao Tanaka; Mitsuhiko Harara, both of Okazaki; Yasutaka Taniguchi; Masanaga Suzumura, both of Nagoya; Minoru Tatemoto, Okazaki; Naotake Kumagai, Aichi, all of Japan

[73] Assignee: Mitsubishi Jidosha Kogyo Kabushiki Kaisha, Tokyo, Japan

[21] Appl. No.: 762,041

[22] Filed: Aug. 2, 1985

[30] Foreign Application Priority Data

Aug. 10, 1984 [JP] Japan ................... 59-167351
Aug. 10, 1984 [JP] Japan ................ 59-122663[U]
Aug. 10, 1984 [JP] Japan ................ 59-122664[U]
Sep. 27, 1984 [JP] Japan ................ 59-145998[U]

[51] Int. Cl.⁴ .......................................... B60G 11/26
[52] U.S. Cl. ............................. 280/707; 280/DIG. 1
[58] Field of Search ................ 280/707, DIG. 1, 6 H, 280/6 R, 708, 714

[56] References Cited

U.S. PATENT DOCUMENTS

| 3,608,925 | 9/1971 | Murphy | 280/707 |
| 3,770,292 | 11/1973 | Palazetti | 280/708 |
| 3,848,862 | 11/1974 | Ito et al. | 280/708 |
| 4,506,751 | 3/1985 | Stephens | 280/707 |
| 4,568,096 | 2/1986 | Yew et al. | 280/DIG. 1 |

FOREIGN PATENT DOCUMENTS

| 2848286 | 5/1979 | Fed. Rep. of Germany | 280/707 |
| 53-26021 | 3/1978 | Japan . | |
| 58-30818 | 2/1983 | Japan . | |
| 58-218410 | 12/1983 | Japan . | |
| 59-73311 | 4/1984 | Japan . | |
| 2009062 | 6/1979 | United Kingdom | 280/707 |

Primary Examiner—John J. Love
Assistant Examiner—Kenneth R. Rice
Attorney, Agent, or Firm—Hedman, Gibson, Costigan & Hoare

[57] ABSTRACT

Air spring chambers are provided in suspension units of respective wheels, and air intake solenoid valves and exhaust solenoid valves are provided corresponding to the air spring chambers. Further, switching means for switching the suspension units between the hard and soft states is provided, and when the vehicle's velocity, detected by the vehicle velocity sensors, is less than the set velocity, the suspension units are set to the soft state, and when the vehicle's velocity is the set velocity or higher, the suspension units are set to the hard state to control the switching means in a vehicle suspension apparatus.

21 Claims, 21 Drawing Figures

FIG. 4

| VALVE NO. | 32 | 223 | 273 | 224 | 274 | 242 | 221 | 271 | 222 | 272 | 241 | 30 |
|---|---|---|---|---|---|---|---|---|---|---|---|---|
| NAME / MODE | SELECTION OF EX. PATH | FL SUP. | FL EX. | FR SUP. | FR EX. | FR & FL COMMUNICATE | RL SUP. | RL EX. | RR SUP. | RR EX. | RR & RL COMMUNICATE | SELECTION OF SUP. PATH |
| NORMAL | X | X | X | X | X | O | X | X | X | X | O | X |
| HEIGHT CONT. — F UP | X | O | X | O | X | O | X | X | X | X | O | X |
| HEIGHT CONT. — R UP | X | X | X | X | X | O | O | X | O | X | O | X |
| HEIGHT CONT. — F & R UP | X | O | X | O | X | O | O | X | O | X | O | X |
| HEIGHT CONT. — F DOWN | X | X | O | X | O | O | X | X | X | X | O | X |
| HEIGHT CONT. — R DOWN | X | X | X | X | X | O | X | O | X | O | O | X |
| HEIGHT CONT. — F&R DOWN | X | X | O | X | O | O | X | O | X | O | O | X |
| L.ROLL CONT. — START | O | O | X | X | O | X | O | X | X | O | X | O |
| L.ROLL CONT. — HOLD | O | X | X | X | X | X | X | X | X | X | X | O |
| L.ROLL CONT. — RETURN | X | X | X | X | X | O | X | X | X | X | O | X |
| R.ROLL CONT. — START | O | X | O | O | X | X | X | O | O | X | X | O |
| R.ROLL CONT. — HOLD | O | X | X | X | X | X | X | X | X | X | X | O |
| R.ROLL CONT. — RETURN | X | X | X | X | X | O | X | X | X | X | O | X |
| NOSE DIVE CONT. — START | O | O | X | O | X | X | X | O | X | O | X | O |
| NOSE DIVE CONT. — HOLD | O | X | X | X | X | X | X | X | X | X | X | O |
| NOSE DIVE CONT. — RETURN | O | X | O | X | O | X | O | X | O | X | X | O |
| SQUAT CONT. — START | O | X | O | X | O | X | O | X | O | X | X | O |
| SQUAT CONT. — HOLD | O | X | X | X | X | X | X | X | X | X | X | O |
| SQUAT CONT. — RETURN | O | O | X | O | X | X | X | O | X | O | X | O |

F I G. 11
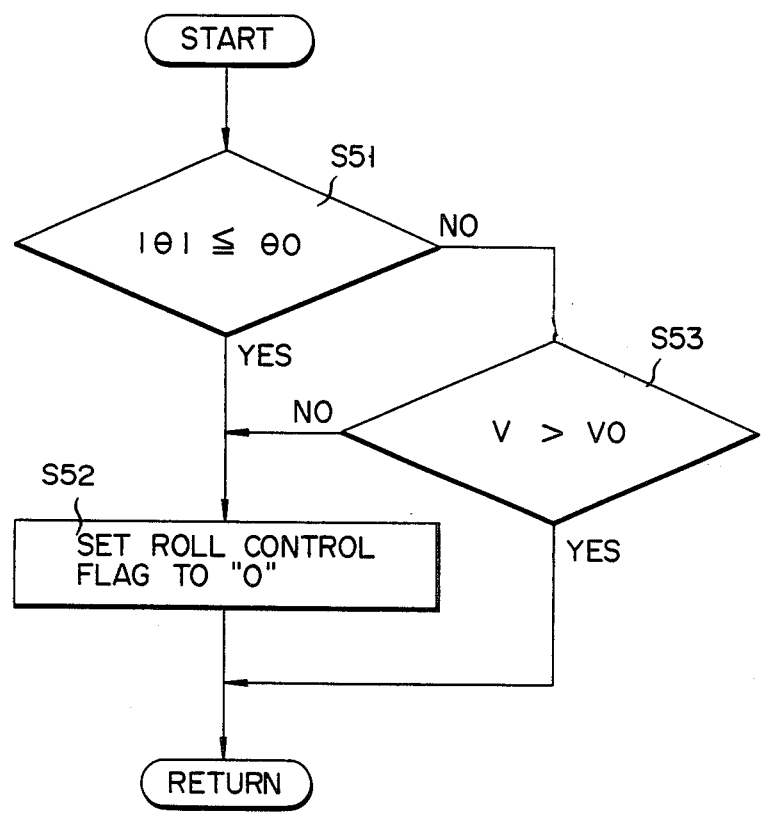

VEHICLE SUSPENSION APPARATUS

BACKGROUND OF THE INVENTION

The present invention relates to a vehicle suspension apparatus having a position controlling function.

In general, a vehicle body rolls or pitches when the vehicle turns, slaloms or is braking quickly. Thus, a suspension apparatus in which fluid spring chambers are provided at both right and left suspension units, in which fluid is supplied in a set amount to the fluid spring chamber of the compressed side in the rolling direction of the vehicle, and the fluid is exhausted in a set amount from the fluid spring chamber of the elongated side to reduce a roll has been considered.

If the hardness of the suspension units is raised, so as to control the above-described roll, the roll can be decreased, but the driver and the passengers are always discomforted.

SUMMARY OF THE INVENTION

It is an object of the present invention to provide a vehicle suspension apparatus wherein the hardness of the suspension units is only raised as required to control and decrease a roll, and held in a soft condition when not required to control a roll. Thus maintaining a comfortable riding environment for the driver and his passengers.

According to the present invention, there is provided a vehicle suspension apparatus comprising: fluid spring chambers provided at both right and left suspension units, fluid supply means for supplying fluid through supply control valves to the fluid spring chambers of the suspension units, fluid exhaust means for exhausting the fluid through exhaust control valves from the fluid spring chambers of the suspension units, roll detecting means for detecting a roll of a vehicle's body, roll control means for reducing such a roll by opening the supply control valve for the fluid spring chamber on the compressed side and opening the exhaust control valve for the fluid spring chamber on the elongated side (during the set control period of time) on the basis of a signal from the roll detecting means, hard/soft switching means provided in the suspension units for switching the suspension units to either the hard or soft state, running state detecting means for detecting the running state of the vehicle, and hard/soft control means for controlling the hard/soft switching means so that the suspension units become soft when the running state (detected by the running state detecting means) satisfies the set condition and controlling the hard/soft switching means so that the suspension unit becomes hard when the running state does not satisfy the conditions.

BRIEF DESCRIPTION OF THE DRAWINGS

FIG. 4 is a view showing the opening and closing state of solenoid valves of FIG. 1 for controlling the vehicle height and the vehicle position;

FIG. 11 is a flow chart showing the process of judging the return of the roll control in step S20 of the flow chart of FIG. 5;

DETAILED DESCRIPTION OF THE PREFERRED EMBODIMENTS

The present invention will be described in detail with reference to the preferred embodiment in conjunction with the accompanying drawings.

A first embodiment of the present invention will be first described with reference to FIGS. 1 to 11.

Figure 1:
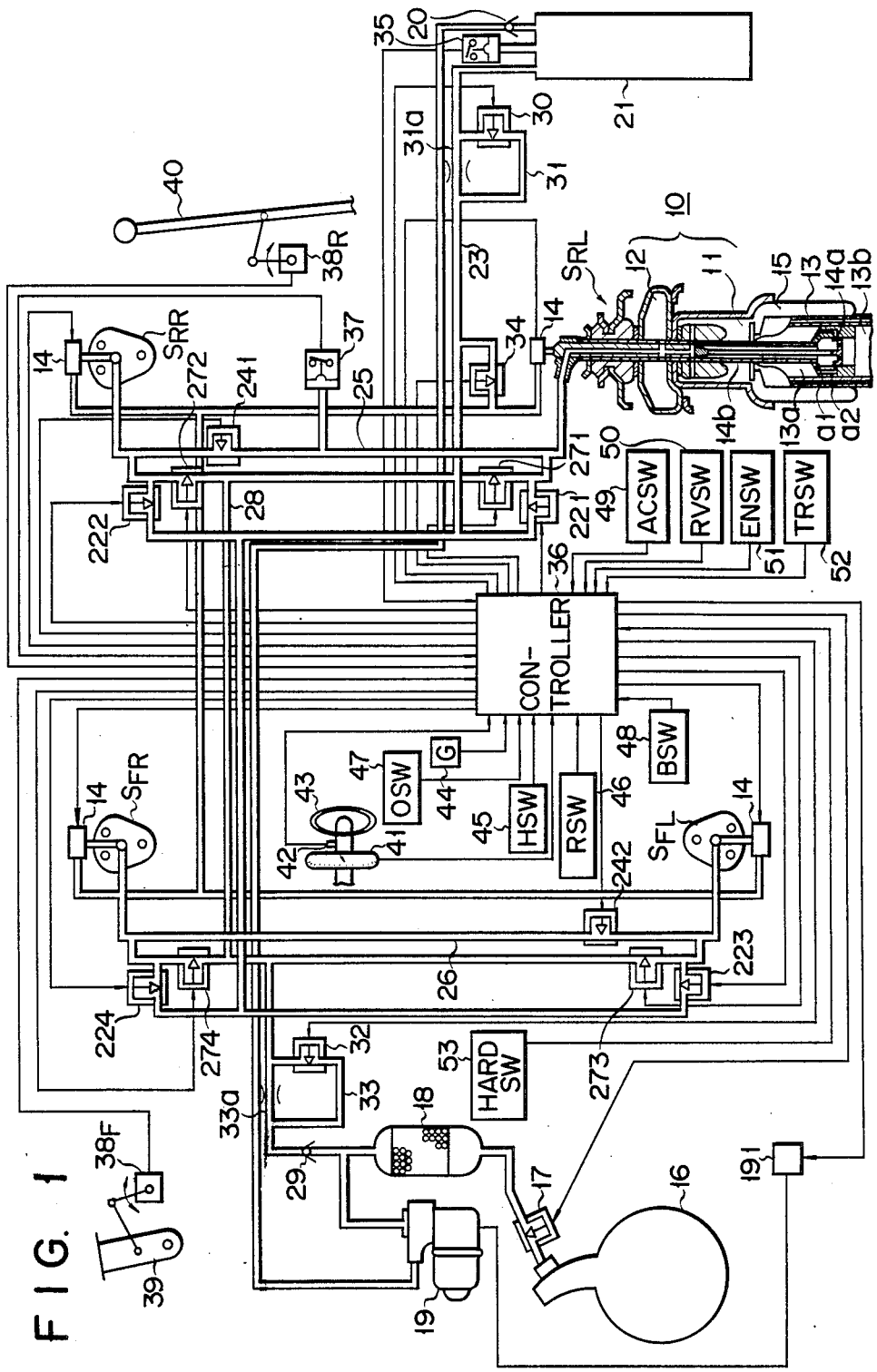
FIG. 1 is a view of the entire construction showing a suspension apparatus according to a first embodiment of the present invention.

In FIG. 1, reference numeral $S_{FR}$ denotes a front right wheel suspension unit of a vehicle; $S_{FL}$, a front left wheel suspension unit; $S_{RR}$, a rear right wheel suspension unit; and $S_{RL}$, a rear left wheel suspension unit. The units $S_{FR}$, $S_{FL}$, $S_{RR}$ and $S_{RL}$ have an identical structure and are exemplified by the unit $S_{RL}$. The unit $S_{RL}$ comprises a main air spring chamber 11, and an auxiliary air spring chamber 12, a shock absorber 13 and a coil spring (not shown) used as an auxiliary spring. An air spring 10 consists of the chambers 11 and 12.

Reference numeral 14 designates an actuator for switching the damping force of the shock absorber 13 to hard or soft. The actuator 14 rotatably displaces a damping force switching valve 14a together with a control rod 14b to select either one of the states so that a first oil chamber 13a, defined by a piston, can only communicate through an orifice a1 with a second oil chamber 13b, and the chamber 12 can communicate through both the orifices a1 and a2 with the chamber 13b.

The actuator 14 further rotates the control rod 14b to simultaneously control the communication and non-communication between the chambers 11 and 12, thereby simultaneously switching between the hard and the soft settings of the air spring. The actuator 14 is controlled by a controller 36 having a microcomputer.

Reference numeral 15 denotes a bellows for defining part of the chamber 11.

Reference numeral 16 denotes an air cleaner. Air received through the cleaner 16 is supplied to a drier 18 through an atmospheric air sealing solenoid valve 17. Air dried by the drier 18 is compressed by a compressor 19 and stored in a reserve tank 21 through a check valve 20. Reference numeral 191 denotes a compressor relay which is controlled by the controller 36.

The tank 21 is connected to the main and auxiliary air spring chambers 11 and 12 in the suspension units through an air intake pipe 23 having air supply solenoid valves 221 to 224 respectively. The chambers 11 and 12 in the units $S_{FL}$ and $S_{FR}$ are coupled to each other through a communicating pipe 26 having a communicating solenoid valve 242. Similarly, the chambers 11 and 12 in the units $S_{RL}$ and $S_{RR}$ are coupled to each other through a communicating pipe 25 having a communicating solenoid valve 241.

The compressed air in the chambers 11 and 12 in the suspension units is exhausted through an exhaust pipe 28 which has exhaust solenoid valves 271 to 274, a check valve 29, the drier 18, the valve 17 and the cleaner 16.

A pipe 31 having an air intake path selection solenoid valve 30 is arranged in parallel with the pipe 23. When the valve 30 is closed, the compressed air is supplied from the tank 21 to the respective suspension units through only a small-diameter path 31a. However, when the valve 30 is opened, the compressed air is supplied from the tank 21 to the respective suspension units through the path 31a and the large-diameter path 31.

A pipe 33 having an exhaust path selection solenoid valve 32 is arranged in parallel with the pipe 28. When the valve 32 is closed, the compressed air is exhausted from the respective suspension units to the drier 18 through a small-diameter path 33a. However, when the valve 32 is opened, the compressed air is exhausted through the path 33a and the large-diameter path 33.

A hard/soft selection solenoid valve 34 is inserted between the pipe 23 and the unit 14. The valve 34 is controlled in response to a signal from the controller 36.

The pressure level in the tank 21 is detected by a pressure switch 35. A detection signal from the switch 35 is supplied to the controller 36. Reference numeral 37 denotes a pressure sensor for detecting the internal pressure of the chambers 11 and 12 of the rear suspension units $S_{RL}$ and $S_{RR}$. A detection signal from the sensor 37 is supplied to the controller 36.

Reference numeral 38F denotes a front vehicle height sensor mounted between a front right lower arm 39 of a suspension and the vehicle body to detect the vehicle's height at the front portion of the body. Reference numeral 38R denotes a rear vehicle height sensor mounted between a rear left lateral rod 40 of a suspension and the vehicle body to detect the vehicle's height at the rear portion of the body. Vehicle height signals from the sensors 38F and 38R are supplied to the controller 36. Each of these sensors 38F and 38R detects the distance between the current level and a normal, high or low vehicle height level.

Reference numeral 41 denotes a vehicle velocity sensor for detecting a vehicle's velocity; and 42, a steering state sensor for detecting the steering angle and steering angular velocity of a steering wheel 43. Reference numeral 44 denotes an acceleration (G) sensor for detecting back-and-forth, right-and-left and vertical acceleration. The sensor 44 can be of a type wherein a weight is suspended and a shielding plate, interlocked with the weight, shields light from a light-emitting diode so as to prevent light from reaching a photodiode when no acceleration acts, and acceleration is detected when the weight is inclined or moved so as to cause light from the light-emitting diode to reach the photodiode. Detection signals from the sensor 41, 42 and 44 are supplied to the controller 36.

Reference numeral 45 denotes a vehicle height selection switch for setting a target vehicle height to a high vehicle height (HIGH), a low vehicle height (LOW) or an automatic vehicle height (AUTO); and 46, a position control selection switch (RSW) for controlling the position control so as to decrease the rolling of the vehicle. Reference numeral 47 denotes a hydraulic sensor (OSW) for detecting the hydraulic pressure of the engine lubricant; 48, a brake sensor (BSW) for detecting the depression angle of the brake pedal; 49, an accelerator pedal sensor (ACSW) for detecting the depression state of the accelerator pedal; 50, an engine speed sensor (RVSW) for detecting an engine's speed; 51, an engine switch (ENSW) such as an ignition switch for starting the engine; and 52, a gear position sensor (TRSW) for detecting the gear position of the vehicle's transmission; and 53, a hard selection switch (HARD SW) for setting the suspension units $S_{FL}$, $S_{FR}$, $S_{RL}$, $S_{RR}$ to hard. Output signals from the switches 45, 46 and 51 and detection signals from the sensors 47, 48, 49, 50, 52 and 53 are supplied to the controller 36.

Figure 2A:
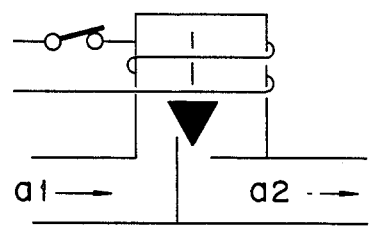
FIGS. 2A and 2B are views respectively showing the operating state of a normally closed valve of FIG. 1.
Figure 2B:
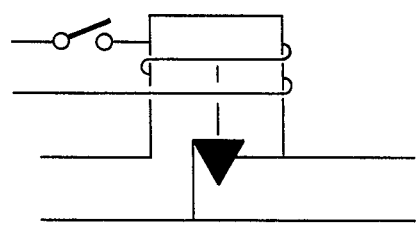

The valves 17, 221 to 224, 271 to 274, 30 and 34 comprise normally closed valves, respectively; and the valves 241 and 242 comprise normally open valves, respectively. FIGS. 2A and 2B are views for explaining the normally closed valves, and FIG. 2A shows the state that the valve is energized and opened. In this state, air flows as designated by arrows a1 to a2. FIG. 2B shows the state that the valve is not energized. In this state, air flow is interrupted. The normally open valves are not shown, but have an operation reverse to the normally closed valves.

Figure 3:
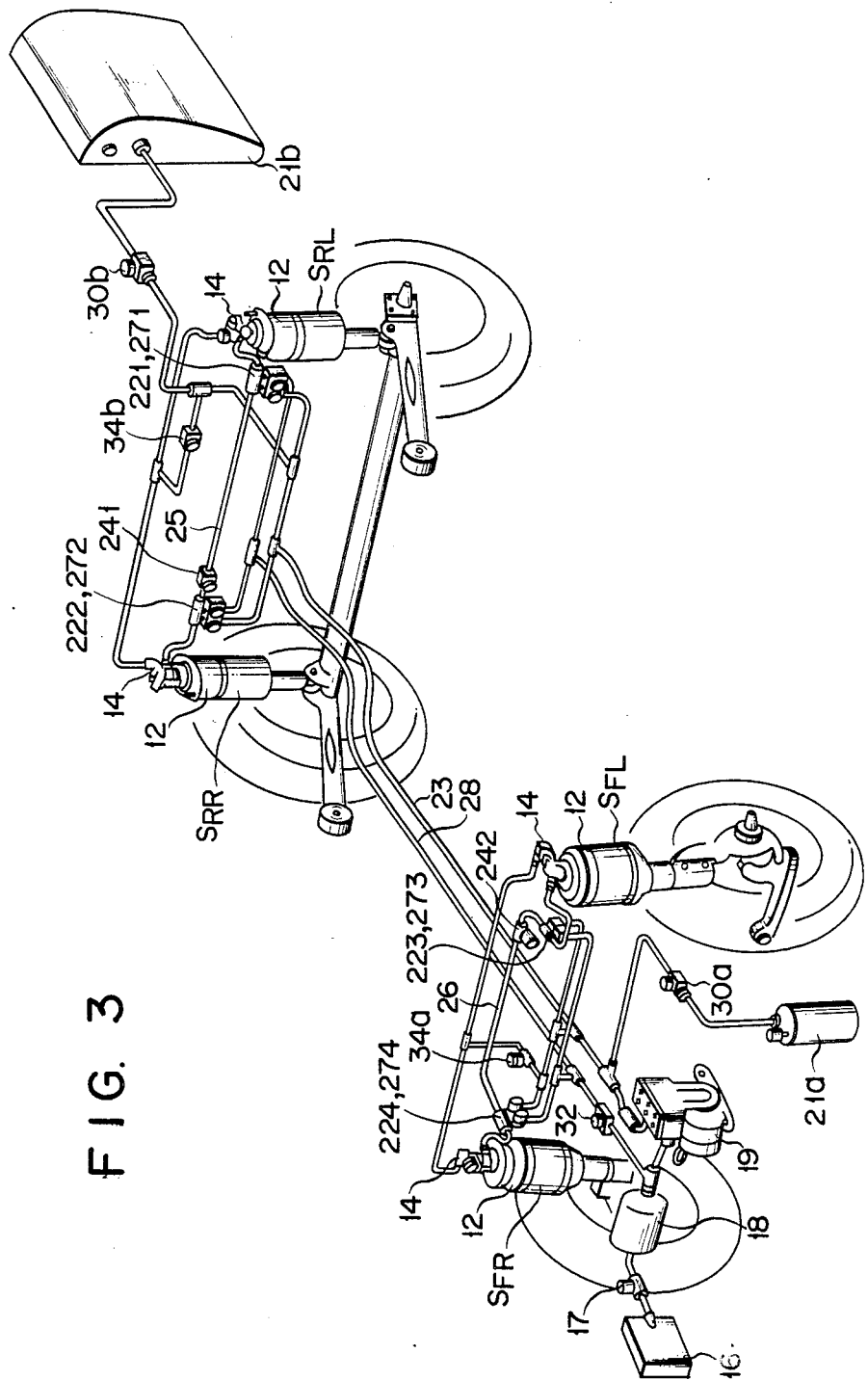
FIG. 3 is a view of the entire construction of another example of the vehicle suspension apparatus according to the first embodiment.

FIG. 3 shows another example of an air pipe of the above-mentioned suspension apparatus. In this example, the reserve tank 21 in FIG. 1 is divided into a front reserve tank 21a and a rear reserve tank 21b. Thus, the air intake path selection valve 30 is divided into a front valve 30a and a rear valve 30b. Similarly, the hard/soft selection solenoid valve 34 is divided into a front valve 34a and a rear valve 34b.

The controller 36 compares the target vehicle height set by a vehicle height selection switch 45 with the vehicle heights detected by vehicle height sensors 38F, 38R, and controls the respective valves so that the vehicle height coincides with the target heights, respectively, thereby controlling the vehicle height.

The position control function can be performed as follows. The controller 36 detects a change in the vehicle position and its direction in accordance with the outputs from the corresponding sensors and controls the corresponding solenoid valves so as to cancel the change in the vehicle position.

When vehicle height control described above is to be performed, the valves 30 and 32 are closed to slowly change the vehicle height so as to eliminate discomfort to the driver and passengers. When position control described above is to be performed, the valves 30 and 32 are opened to cancel the influence of a rapid position change.

The opening/closing states of the respective valves will be described with reference to FIG. 4 when the above-mentioned vehicle height and position control operations are performed. FIG. 4 shows the opening/closing states of the respective valves in FIG. 1 in the respective modes. Circles represent the ON state; and crosses represent the OFF state.

In the normal mode, only the valves 242 and 241 are opened, so that the air spring 10 in the right and left suspension units communicate with each other. In this state, since the volume of each air spring 10 is substantially increased, the spring constant is decreased to improve comfort.

In the vehicle height control mode, vehicle height signals detected by the sensors 38F and 38R are compared with the target vehicle heights set by the switches 45, respectively. In order to increase the vehicle height, the corresponding supply solenoid valves are opened. However, in order to decrease the vehicle height, the corresponding exhaust solenoid valves are opened. In the vehicle height control mode, the valves 242 and 241 are opened to maintain comfort. The valves 30 and 32 are closed in the height control mode. Therefore, height control is performed slowly to maintain the comfort of the driver and passengers.

Rolling control comprises a start mode in which the compressed air is supplied to the air spring 10 which is moved downward along the right-and-left direction of the vehicle, and the compressed air is exhausted from the spring 10 which is moved upward, a hold mode in which the state obtained in the start mode is held, and a return mode in which, when the cause of the roll is eliminated, right and left air springs 10 are set to the same pressure.

In the start mode, the associated air supply solenoid valves and the associated air exhaust solenoid valves are opened for a predetermined period of time, and at the same time, the valves 30 and 32 are opened quickly to perform the position control operation. In the hold mode, only the path selection solenoid valves are kept opened. Under this condition, when a lateral acceleration acting on the vehicle during turning is increased, the compressed air must be additionally supplied to and exhausted from the corresponding air spring 10. Such additional supply and exhaust of the compressed air can be quickly performed. In the return mode, only the valves 241 and 242 are opened to restore the same state as in the normal mode.

Braking control (nose dive control) also comprises a start mode in which the compressed air is supplied to the front air spring 10 in a predetermined volume, and at the same time, the compressed air is exhausted from the rear air spring 10 in a predetermined volume; a hold mode in which the state obtained in the start mode is maintained, and a return mode in which the compressed air is exhausted from the front air springs 10 in a predetermined volume, and at the same time the compressed air is supplied to the rear air springs 10 in a predetermined volume.

In the start mode, the valves 223, 224 and 271, 272 are opened for a predetermined period of time, and at the same time, the respective path selection solenoid valves are opened. In the hold mode, only the front and rear path selection solenoid valves are opened in the same manner as for roll control. In the return mode, the valves 273, 274 and 221, 222 are opened, and at the same time the valves 30 and 32 are kept opened.

Acceleration control (squat control) also comprises a start mode in which the compressed air is exhausted from the front air spring 10 and supplied to the rear air spring 10 in a predetermined volume; a hold mode in which the state obtained in the start mode is held; and a return mode in which the compressed air is exhausted from the rear air spring 10 and supplied to the front air spring 10 in a predetermined volume.

In the start mode, the valves 273, 274 and 221, 222 are opened and at the same time the valves 30 and 32 are opened for a predetermined period of time. In the hold mode, the valves 30 and 32 are kept open in the same manner as during the roll control. In the return mode, the compressed air is exhausted from the valves 223 and 224 and is supplied to the valves 271 and 272 for a predetermined period of time, and the valves 30 and 32 are kept opened.

The concrete control by the controller 36 in the first embodiment will be described in accordance with FIGS. 5 to 11.

Figure 5:
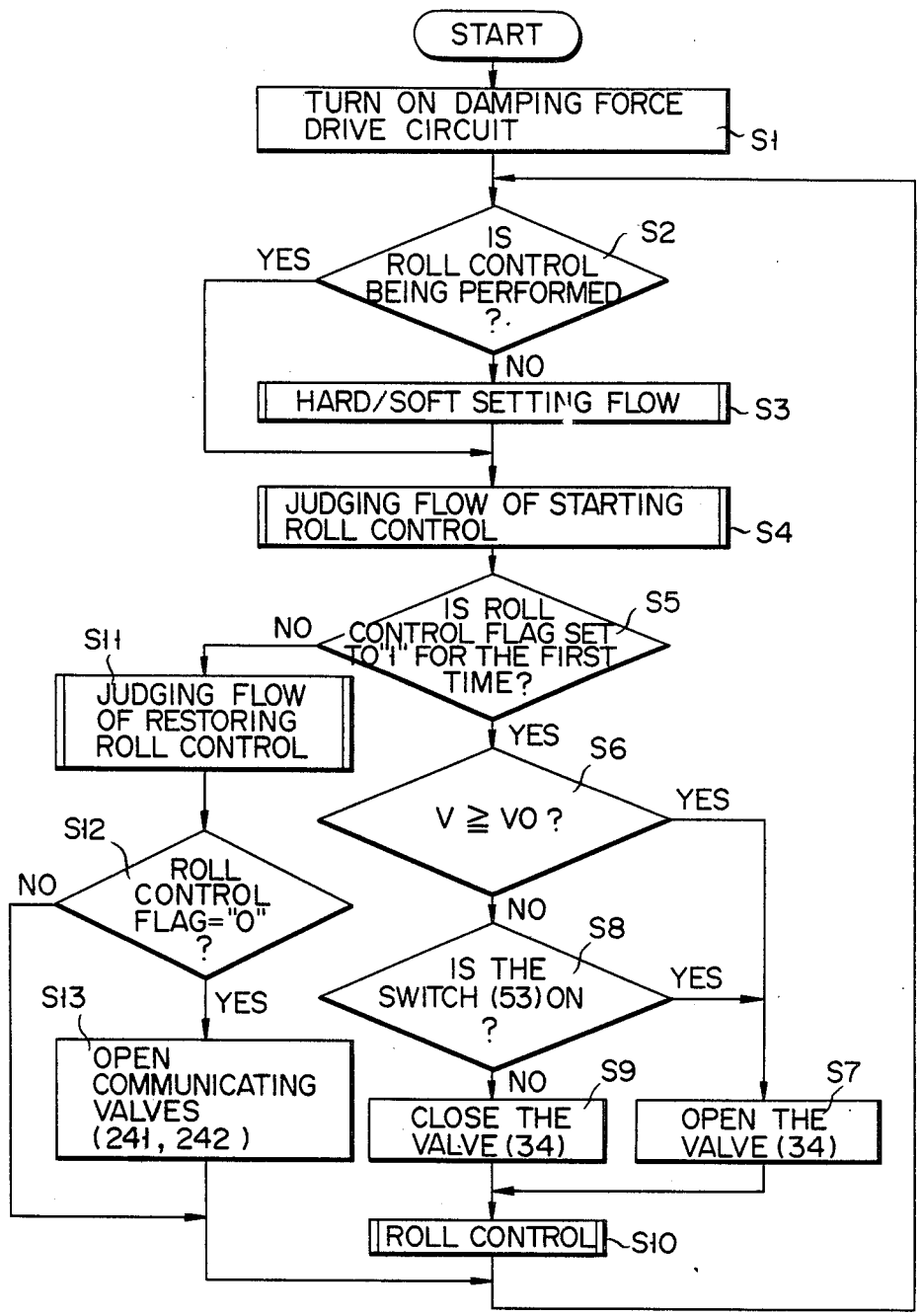
FIG. 5 is a flow chart for switching the hard/soft states of the suspension units in the roll control of the first embodiment.
Figure 6:
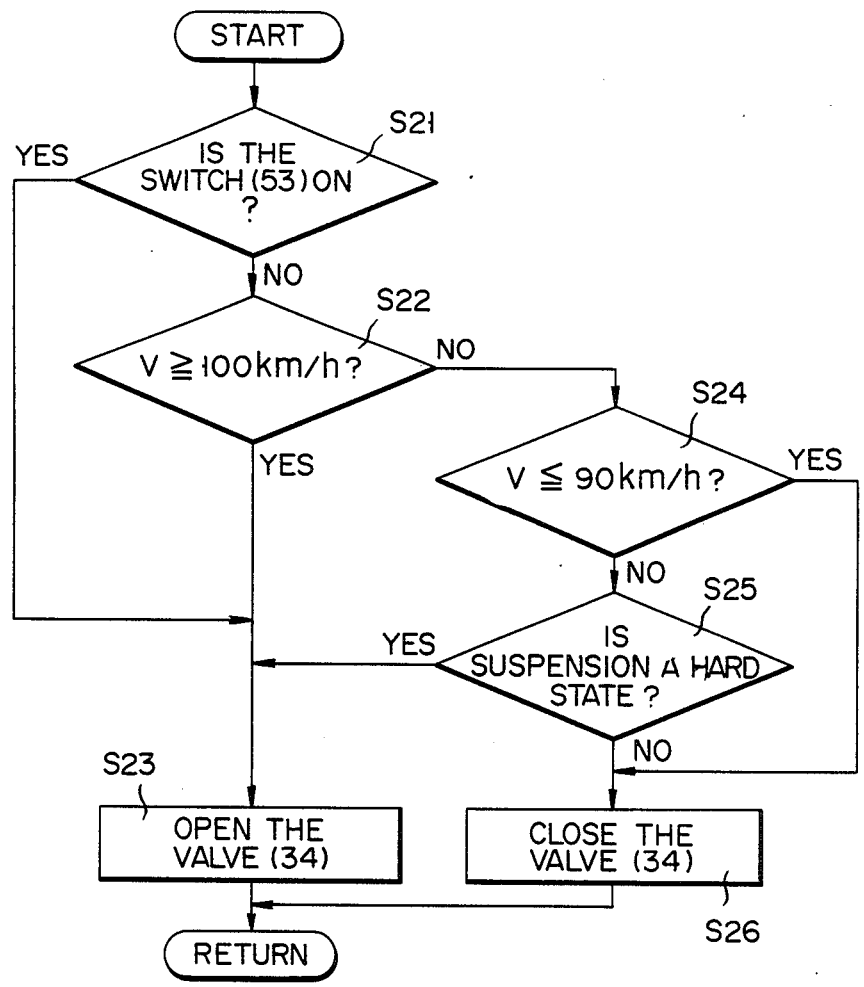
FIG. 6 is a flow chart showing the process of setting the hard/soft states according to the vehicle's velocity in step S12 of the flow chart of FIG. 5.
Figure 7:
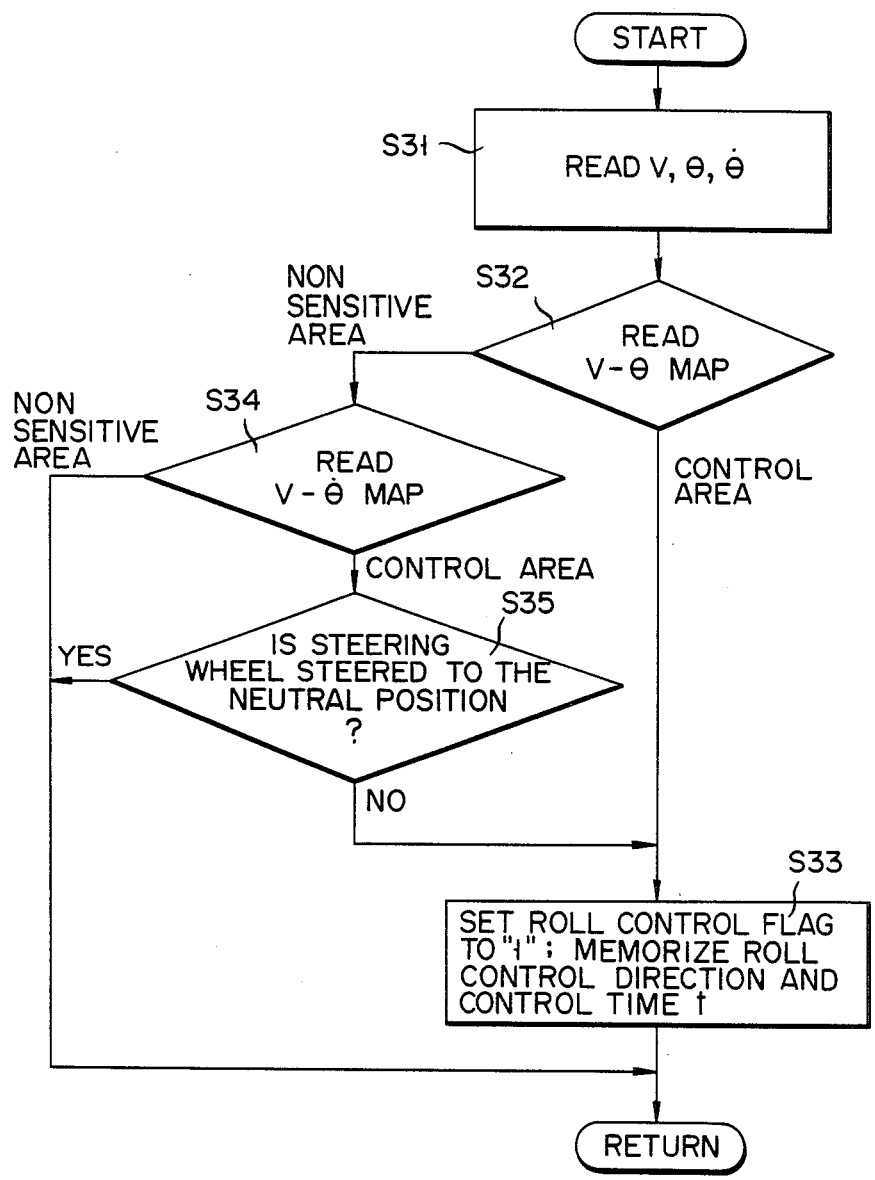
FIG. 7 is a flow chart showing the process of judging the roll control start in step S13 of the flow chart of FIG. 5.
Figure 8:
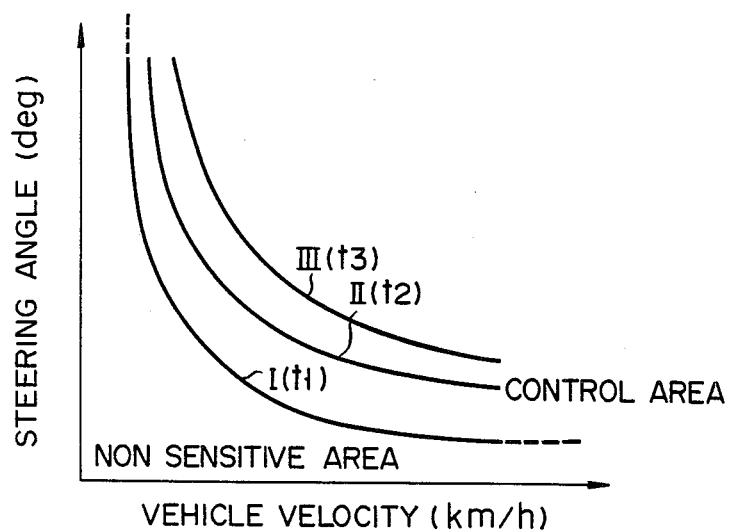
FIG. 8 is a view showing a vehicle's velocity-steering angle map.
Figure 9:
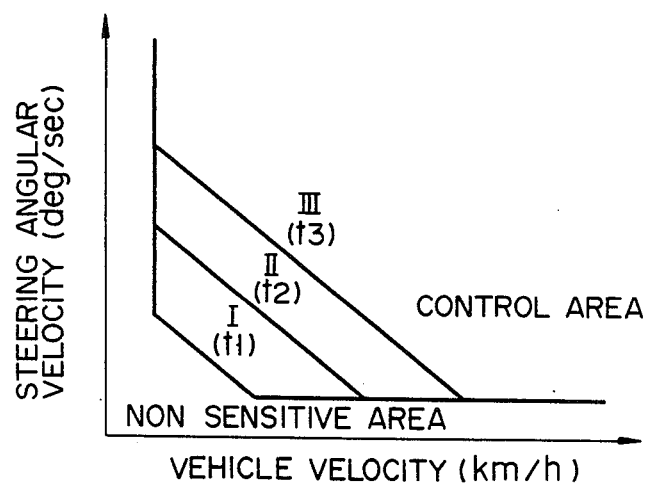
FIG. 9 is a view showing a vehicle's velocity-steering angular velocity map.
Figure 10:
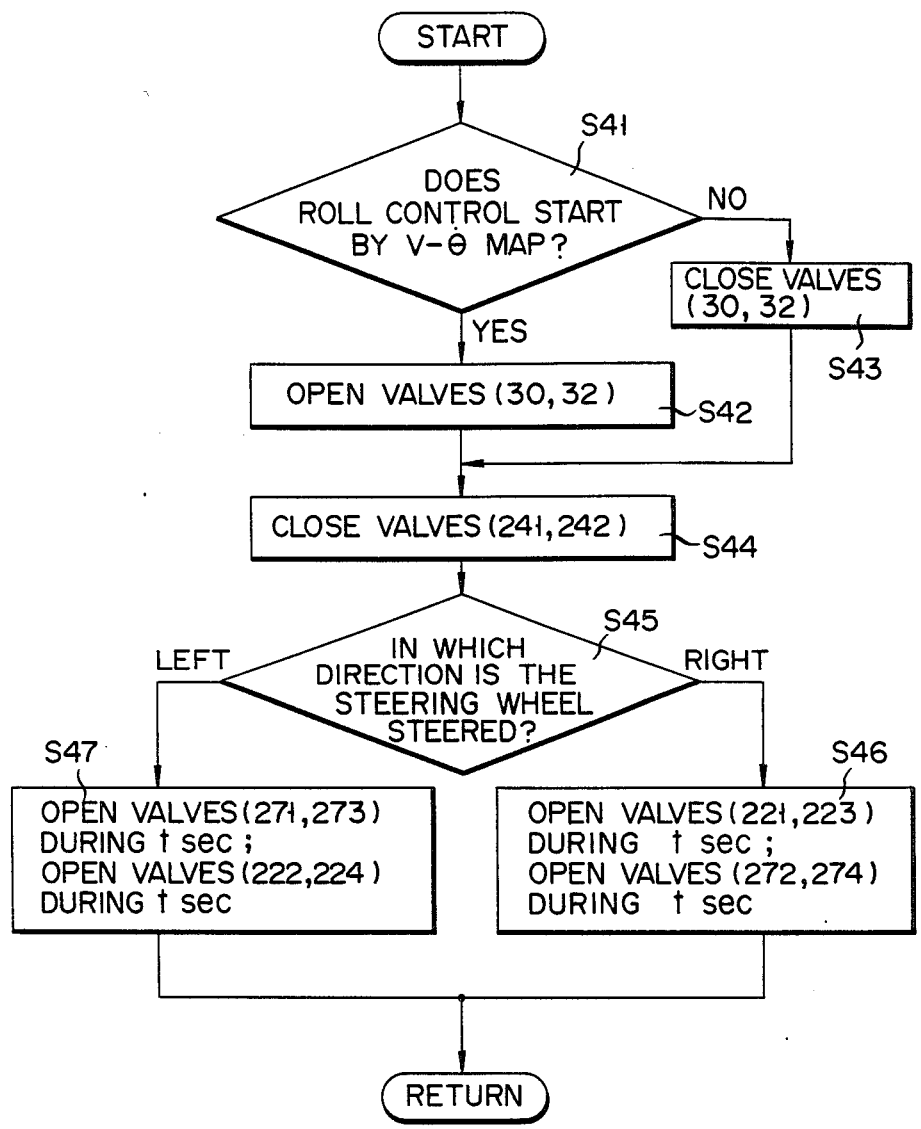
FIG. 10 is a flow chart showing the process of executing the roll control in step S17 of the flow chart of FIG. 5.

FIG. 5 is a flow chart for switching between the hard/soft settings of the suspension units in the roll control, FIG. 6 is a flow chart showing the process of setting either one of the hard/soft settings in accordance with the vehicle's velocity in step S3 of FIG. 5; FIG. 7 is a flow chart showing the process of judging the start of the roll control in step S4 of the flow chart of FIG. 5; FIG. 8 is a view showing a vehicle velocity-steering angle map; FIG. 9 is a view showing a vehicle velocity-steering angular velocity map; FIG. 10 is a flow chart showing the process of executing the roll control in step S10 of the flow chart of FIG. 5; and FIG. 11 is a flow chart showing the process of judging the return of the roll control in step S11 of the flow chart of FIG. 5.

The control content will be first described in accordance with the flow chart shown in FIG. 5.

When the ignition switch is turned on, a damping force drive circuit is turned on in step S1. The flow then advances to step S2 to judge whether or not a roll control is being performed at present. If "NO" in step S2, the flow advances to step S3, and a hard/soft setting flow is executed in accordance with the vehicle's velocity as shown in detail in FIG. 6.

The process of step S3 will be described in detail with reference to FIG. 6.

In step S21, the controller 36 judges whether or not the switch 53 is on. If "NO" in step S21, the flow advances to step S22, the controller 36 judges whether or not the vehicle velocity V detected by the sensor 41 is 100 km/hr or higher. If "YES" in step S22 or "YES" in step S21, the flow then advances to step S23. In step S23, the controller 36 opens the valve (H/S switching valve) 34. Thus, the compressed air of the reserve tank 21 operates the actuator 14 through the valve 34, and the chambers 11 and 12 of the suspension units become noncommunicative to raise the spring constant and the chambers 13a and 13b of the shock absorbers 13 of the suspension units only communicate through the orifice a1. Thus, the damping force is raised, thereby resulting in the hard setting for the suspension units.

On the other hand, if "NO" in step S22, the flow advances to step S24, where it is judged whether or not the vehicle velocity V, detected by the sensor 41, is 90 km/hr or lower. If "NO" in step S24, i.e., if the vehicle's velocity is between 100 km/hr and 90 km/hr, the flow advances to step S25. In step S25, the flow judges whether the suspension units are set to the hard state or not. If "NO" in step S25 or if "YES" in step S24, the flow advances to step S26. Then, the controller 36 closes the valve 34. Thus, the actuator 14 becomes operational, the chambers 11 and 12 of the suspension units become communicative to reduce the spring constant. Simultaneously, the chambers 13a and 13b of the shock absorbers 13 of the suspension units are communicated through the orifices a1 and a2. Thus, the damping force decreases, thereby resulting in a soft state of the suspension units.

As described above, when the vehicle velocity V is 100 km/hr or higher, the suspension units are switched to the hard state. Thus, the running stability of the vehicle at high speed can be remarkably improved. Further, after the vehicle velocity becomes 100 km/hr or higher and the suspension units are switched to the hard state, the suspension units do not switch to the soft state unless the vehicle's velocity becomes 90 km/hr or lower. Thus, the hunting phenomenon of the control when the vehicle's velocity is around 100 km/hr can be prevented.

Turning to FIG. 5, the flow chart of FIG. 5 will be continued.

When step S3 is executed or if "YES" in step S2, the flow advances to step S4, the flow judges the starting roll control shown in detail in FIG. 7.

The content of the flow chart shown in FIG. 7 will be described.

The vehicle's velocity V detected by the sensor 41 as well as the steering angle $\theta$ and the steering angular velocity $\dot{\theta}$ detected by the sensor 43 are read out by the controller 36 in step S31. Then, the flow advances to step S32 to judge whether the present vehicle velocity-steering angle falls in the areas I to III (the area that the position control is performed) in the map or in a non sensitive area (the area that the position control is not performed) with reference to the vehicle's velocity-steering angle $(V-\theta)$ map (the map for deciding the time of opening the valves on the basis of the vehicle's velocity and the steering angle $\theta$ shown in FIG. 8 stored in the controller 36 on the basis of the vehicle velocity V and the steering angle $\theta$. The control areas I to III are set to obtain control times t1 to t3 responsive to the degree of the roll produced by the vehicle's velocity and the steering angle at this time.

If judging that the flow falls in the control areas I to III in step S32, the flow advances to step S33, and a roll control flag is set to "1". Simultaneously, the steering direction of the steering wheel 43 is judged, and stored in a predetermined memory area in the controller 36 together with the control time decided by the control areas I to III.

On the other hand, if an insensitive area is judged in step S32, the flow advances to step S34. In step S34, the present vehicle velocity-steering angular velocity is judged whether in areas I to III (the area that the position control is performed) in the same map or in the non sensitive area (the area that the position control is not performed) with reference to the vehicle velocity-steering angular velocity $(V-\dot{\theta})$ map (the map for deciding the time of opening the valves on the basis of the vehicle velocity and the steering angular velocity) shown in FIG. 9 stored in the controller 36 on the basis of the vehicle velocity and the steering angular velocity. The above-mentioned control areas I to III are set to obtain the control times t1 to t3 responsive to the degree of roll produced at this time.

If it is judged that the present vehicle velocity-steering angular velocity is in the areas I to III in step S34, the flow advances to step S35, where it is judged whether or not the steering direction of the steering wheel 43 is directed to the return side, i.e., to the neutral position. If "NO" in step S35, the flow advances to step S33. If "YES" in step S35, or a non sensitive area is judged in step S34, it is judged that there is no need for position control, and the flow advances to step S5 of FIG. 5.

Returning to FIG. 5, the flow chart shown in FIG. 5 will be continued for explaining.

In step S5, the flow judges whether the roll control flag is set to "1" for the first time, i.e., whether roll control is required or not. If "YES" in step S5, the flow advances to step S6, and judges whether or not the vehicle's velocity is at a predetermined set velocity VO (e.g., 70 km/hr) or higher.

If "YES" in step S6, i.e., if the flow judges that roll control is necessary in the running state and the vehicle velocity is the set velocity or higher, the flow advances to step S7 to open the valve 34 by the controller 36. Thus, the actuator 14 operates to set the spring forces of the suspension units and the damping force to the hard state.

On the other hand, if "NO" in step S6, i.e., the flow judges that the roll control is required in the running state but the vehicle's velocity is less than the set vehicle velocity, the flow advances to step S8 to judge whether or not a hard selection switch 53 is ON. If "YES" in step S8, the flow advances to step S7. If "NO" in step S8, the flow advances to step S9 to close the valve 34 by the controller 36. Thus, the actuator 14 is not operated, the spring forces of the suspension units and the damping force are set to the soft state.

When the step S9 or the above-mentioned step S7 is executed, the flow advances to step S10, and the roll control execution flow shown in detail in FIG. 10 is performed.

The content of the flow chart shown in FIG. 10 will be described.

In step S41 it is judged whether or not the roll control is performed on the basis of the control area of the vehicle velocity-steering angular velocity map shown in FIG. 9. If "YES" in step S41, the flow advances to step S42 to perform the fast roll control to open the valves 30 and 32 by the controller 36.

On the other hand, if "NO" in step S41, i.e., if it is judged that the slow steering of the steering wheel 43 is performed on the basis of the control area of the vehicle velocity-steering angle map shown in FIG. 8, the flow advances to step S43 to perform the slow roll control in response thereto to close the valves 30 and 32 by the controller 36.

When the step S43 or the above-mentioned step S42 is processed, the flow advances to step S44 to close the valves 241, 242 by the controller 36, thereby interrupting the communications between the suspension units $S_{FL}$ and $S_{FR}$ and between the units $S_{RL}$ and $S_{RR}$. When the step S44 is performed, the flow advances to step S45 to judge in which direction the steering wheel is steering.

If it is judged in step S45, that the steering is to the right the flow advances to step S46. In step S46, the valves 221, 223 are opened by the controller 36 during control time t stored in step S33 of the flow chart of FIG. 7, and the valves 272, 274 are opened simultaneously during the control time t. Thus, the air springs 10 of the units $S_{FL}$, $S_{RL}$ are supplied with compressed air in the set amount, and compressed air is exhausted in the set amount through the drier 18 and the air cleaner 16 from the air springs 10 of the units $S_{FR}$, $S_{RR}$. Consequently, the leftward roll to occur by steering rightward the steering wheel can be suppressed.

If it is judged in step S45, that the steering is to the left the flow advances to step S47. In step S47, the valves 222, 224 are opened by the controller 36 during control time t stored in step S33 of the flow chart of FIG. 7, and the valves 271, 273 are simultaneously opened during control time t. Thus, compressed air is supplied in the set amount from the tank 21 to the air springs 10 of the units $S_{FR}$, $S_{RR}$, and the compressed air is exhausted in the set amount from the air springs 10 of the units $S_{FL}$, $S_{RL}$ through the drier 18 and the air cleaner 16. Consequently, the rightward roll occur by steering leftward the steering wheel at the vehicle body can be suppressed. When the step S46 or step S47 is performed, the flow advances to the return shown in FIG. 5, i.e., step S2, and the next change is observed.

Returning to FIG. 5, an explanation of the flow chart of FIG. 5 will be continued.

If "NO" in step S5, i.e., if the flow judges that there is no need for the roll control in step S4, the flow advances to step S11 to perform the roll control return judging flow shown in detail in FIG. 11.

The content of the flow chart shown in FIG. 11 will be described.

In step S51, the flow judges whether or not the steering angle $\theta$ detected by the steering sensor 42 is the predetermined steering angle $\theta_0$ or less. If "YES" in step S51, the flow advances to step S52 to set the roll control flag to "0", and the flow advances to step S12 of the flow chart of FIG. 5. If "NO" in step S51, the flow advances to step S53, and judges whether or not the vehicle velocity V detected by the sensor 41 is the predetermined vehicle velocity (e.g., 20 km/hr) or larger. If "NO" in step S53, i.e., if the vehicle's velocity is lower than the set vehicle velocity even if the steering angle $\theta$ of the steering wheel 43 is larger than the set steering angle $\theta_0$, the flow judges that there is no need for roll control, and advances to step S52. If "YES" in step S53, i.e., when the steering angle $\theta$ of the steering wheel is larger than the set angle $\theta_0$ and the vehicle's velocity is higher than the set vehicle velocity, the flow advances to step S12 of the flow chart of FIG. 5.

Returning to FIG. 5, and the explanation of the flow chart shown in FIG. 5 will be continued.

In step S12, the flow judges whether or not the roll control flag is "0". If "YES" in step S12, the flow advances to step S13 to control the return of the roll control. In other words, in step S13, the valves 241, 242 are opened by the controller 36, and the air springs 10 of the units $S_{FL}$, $S_{FR}$ and the air springs 10 of the units $S_{RL}$, $S_{RR}$ becomes communicative, and the suspension units are returned to the state before the roll control.

According to the first embodiment as described above, the roll of the vehicle body produced at the turning time can be effectively suppressed, and the following advantages can be provided. In addition, as is apparent from the steps S6 to S9 in FIG. 5, if the vehicle's velocity is the set velocity $V_0$ km/hr (e.g., 70 km/hr) or higher, the suspension units are set to the hard state to perform the roll control, and if the vehicle's velocity is less than the set velocity $V_0$ km/hr, the units are set to the soft state to perform the roll control. Therefore, the roll of the vehicle's body can be effectively suppressed at 70 km/hr or higher, and the roll can be reduced while maintaining comfort at the velocity of 70 km/hr or lower. In other words, the reciprocal actions of the steering stability and comfort can be maximumized.

Figure 12:
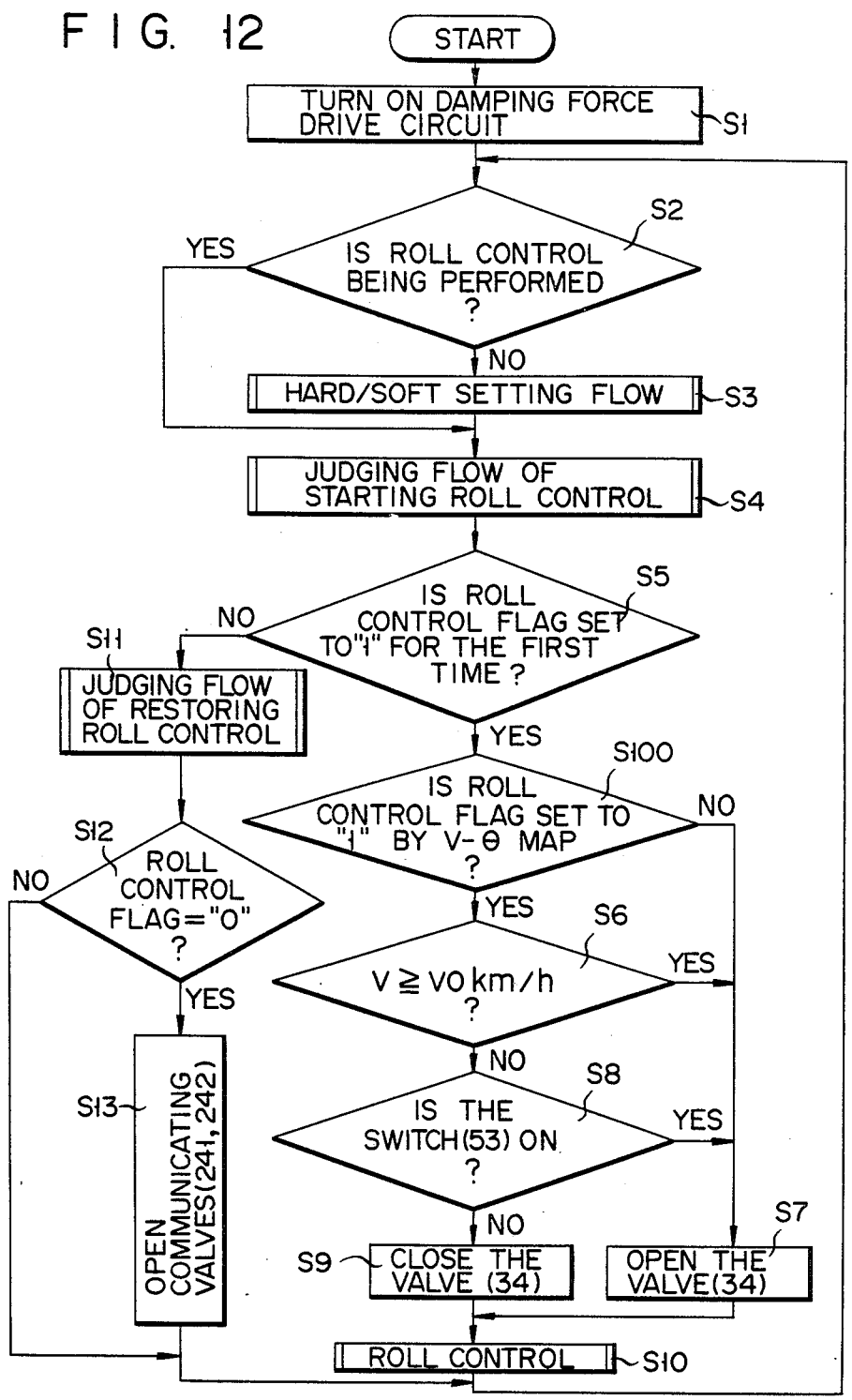
FIG. 12 is a flow chart showing a second embodiment.

A second embodiment of the present invention will be described in accordance with FIG. 12. The second embodiment has substantially the same construction as that of the first embodiment except that step S100 is provided between step S5 and step S6 of the flow chart of FIG. 5.

In step S100, the flow judges whether the roll control flag is set or not by the control area of the vehicle velocity-steering angle map in step S4. If "YES" in step S100, the flow advances to step S6, and the same process as the first embodiment is performed. If "NO" in step S100, the flow advances to step S7, and the suspension units are set to the hard state.

Therefore, according to the second embodiment, when the roll control is performed by the control area of the vehicle velocity-steering angular velocity map, the suspension units are switched to the hard state under any condition, and when the roll control is performed in the control are of the vehicle velocity-steering angle map, the suspension units are switched to hard state only when the vehicle's velocity is the set velocity or higher, and apart from this the suspension units are switched to the soft state. In other words, according to the second embodiment, in the case of roll control when the steering wheel 43 is abruptly turned the units are always switched to the hard state, and if the vehicle's velocity is the set velocity or higher in the case of the slow steering of the steering wheel 43, the suspension units are switched to the hard state.

Figure 13:
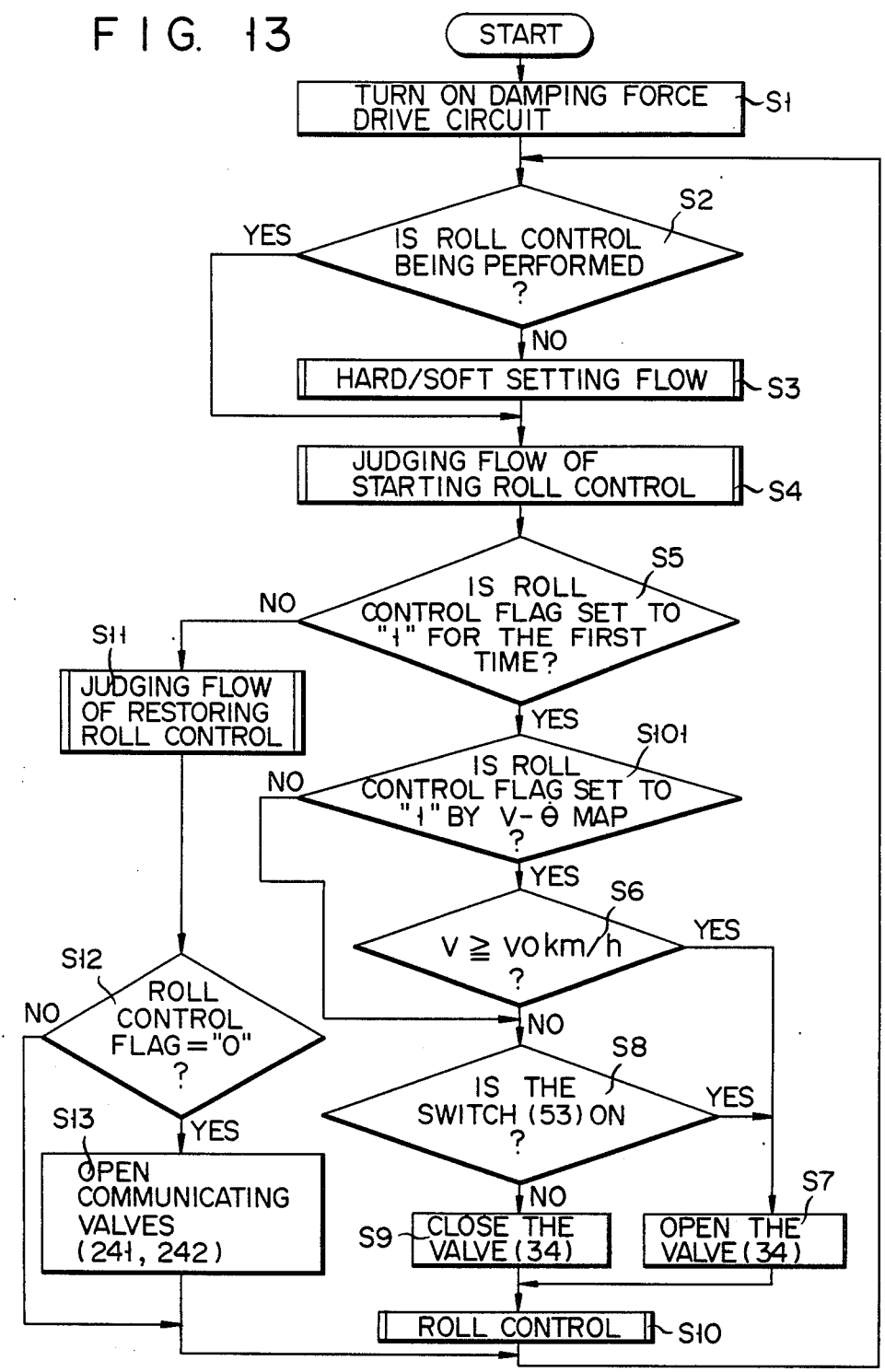
FIG. 13 is a flow chart showing a third embodiment.

A third embodiment of the present invention will be described in accordance with FIG. 13. The third embodiment has substantially the same construction as that of the first embodiment except that step S101 is provided between the step S5 and the step S6 of the flow chart of FIG. 5 in the first embodiment.

In step S101, it is judged whether or not the roll control flag is set by the control area of the vehicle velocity-steering angular velocity map in step S4. If "YES" in step S101, the flow advances to step S6, and the same process as the first embodiment will be performed. If "NO" in step S101, the flow advances to step S8.

Therefore, according to the third embodiment, the suspension units are switched to the hard state only when the roll control is performed by the control area of the vehicle velocity-steering angular velocity map and the vehicle's velocity is the set velocity or higher, and the units are switched to the soft state except for this. According to the third embodiment, the units are for switched to the hard state only when the steering wheel 43 is abruptly turned and vehicle velocity is the set vehicle velocity or higher.

Figure 14:
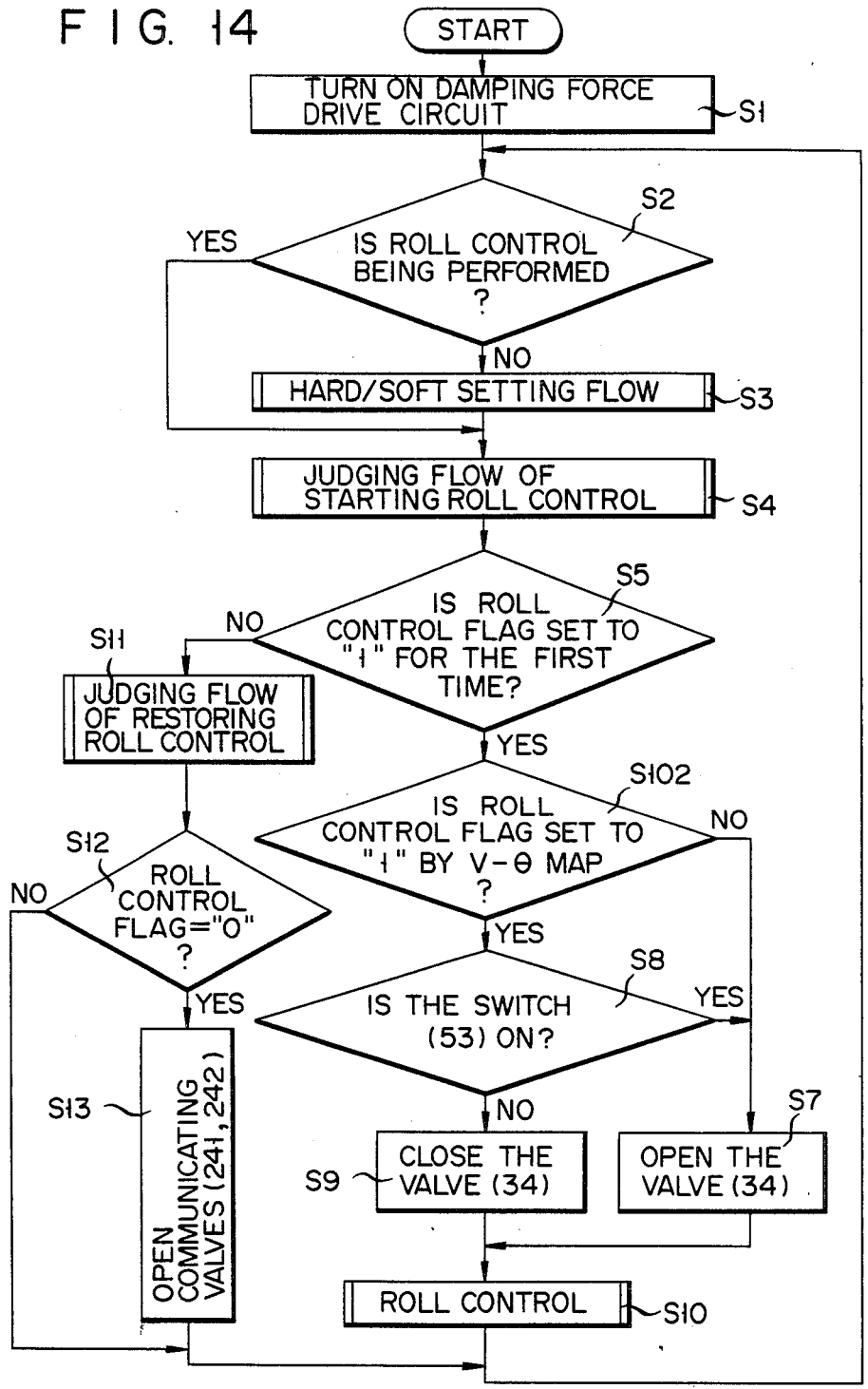
FIG. 14 is a flow chart showing a fourth embodiment.

A fourth embodiment of the present invention will be described in accordance with FIG. 14. The fourth embodiment has fundamentally the same construction as that of the first embodiment except that a step S102 is provided instead of step S6 of the flow chart shown in FIG. 5 in the first embodiment.

In step S102, it is judged whether or not the roll control flag is set by the control area of the vehicle velocity-steering angle map in step S4. If "YES" in step S102, the flow advances to step S8. If "NO" in step S102, the flow advances to step S7.

Therefore, according to the fourth embodiment, the suspension units are switched to the hard state under any condition when the roll control is performed by the control area of the vehicle velocity-steering angular velocity map. In other words, according to the fourth embodiment, the units are switched to the hard state only when the steering wheel 43 is abruptly turned.

Figure 15:
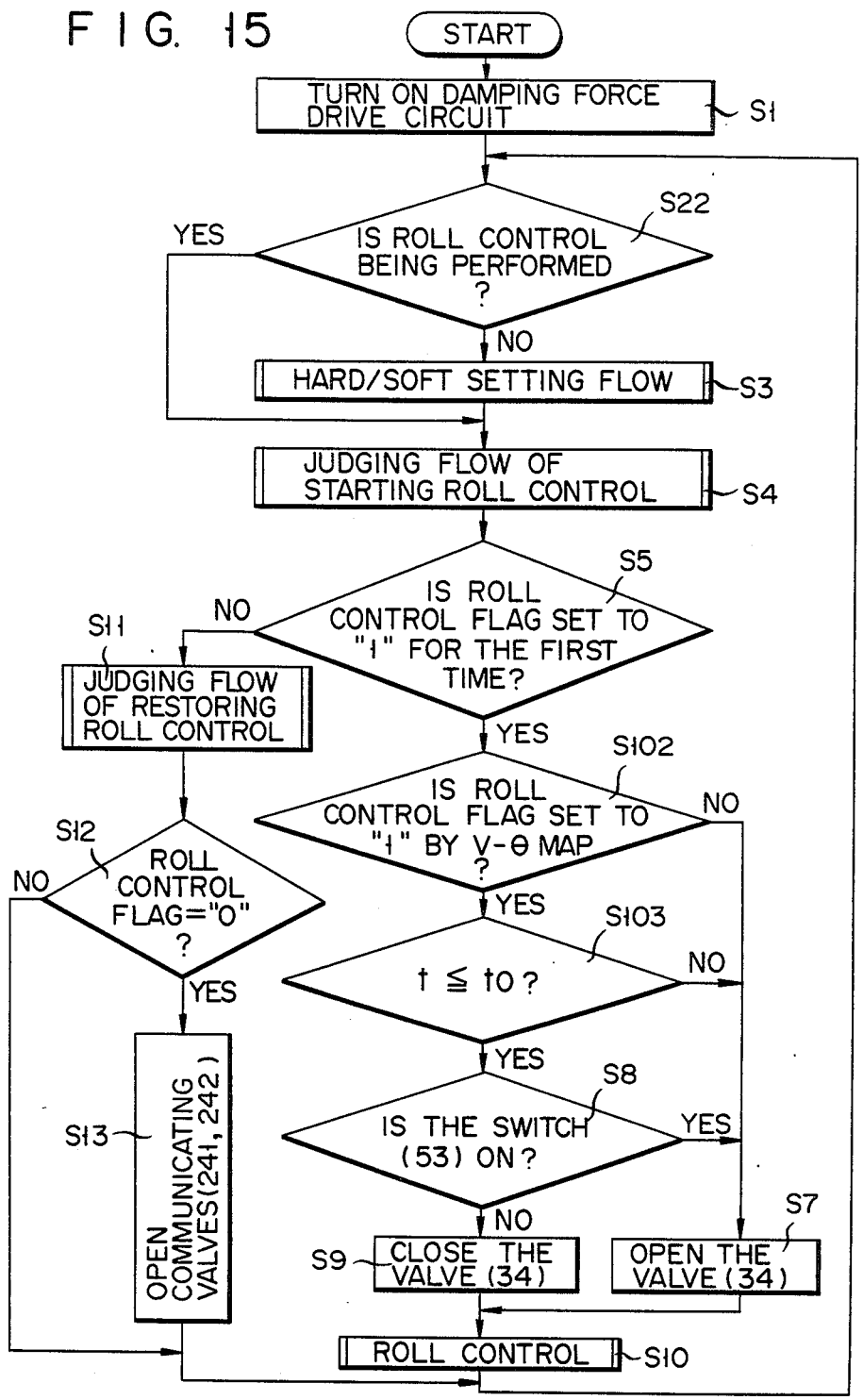
FIG. 15 is a flow chart showing a fifth embodiment.

A fifth embodiment of the present invention will be described in accordance with FIG. 15. The fifth embodiment has substantially the same construction as that of the fourth embodiment except that step S103 is provided between the step S102 and step S8 of the flow chart shown in FIG. 14.

In step S103, it is judged whether or not the control time obtained by the vehicle velocity-steering angle map is the preset control time $t_0$ or shorter in step S4. If "YES" in step S103, the flow advances to step S8. If "NO" in step S103, the flow advances to step S7.

Therefore, according to the fifth embodiment, the suspension units are switched to the hard state under any condition when the roll control is performed by the control area of the vehicle velocity-steering angular velocity map, the units are switched to the hard state only when the control time obtained by the vehicle velocity-steering angle map exceeds the set time $t_0$, and the units are switched to the soft state in all other cases. In other words, according to the fifth embodiment, during the roll control when the wheel 43 is abruptly turned, the units are always switched to the hard state, and during the roll control when the wheel 43 is slowly turned, the units are switched to the hard state only when the control time exceeds the set control time $t_0$ sec.

Figure 16:
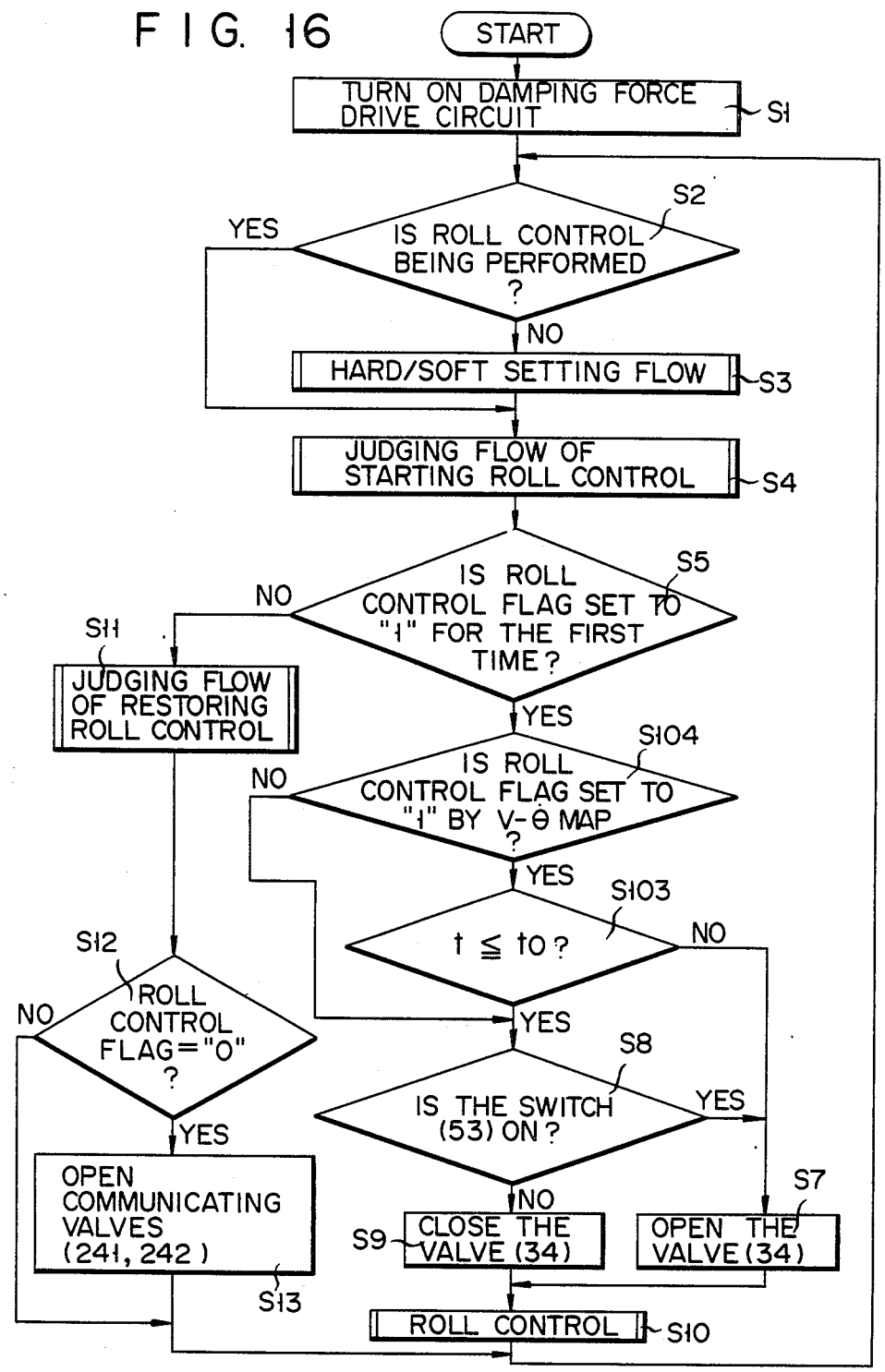
FIG. 16 is a flow chart showing a sixth embodiment.

A sixth embodiment of the present invention will be described in accordance with FIG. 16. The sixth embodiment has fundamentally the same construction as that of the fifth embodiment except that step S104 is provided instead of step S102 of the flow chart shown in FIG. 15.

In step S104, it is judged whether or not the control time obtained by the vehicle velocity-steering angular velocity map is the preset control time $t_0$ or less in step S4. If "YES" in step S104, the flow advances to step S8. If "NO" in step S104, the flow advances to step S7.

Therefore, according to the sixth embodiment, the suspension units are switched to the hard state only when the roll control is performed by the control area of the vehicle velocity-steering angular velocity map and the control time exceeds the set time $t_0$ sec., and the units are switched to the soft state in all other cases. In other words, according to the sixth embodiment, the units are switched to the hard state only when the wheel 43 is abruptly turned.

Figure 17:
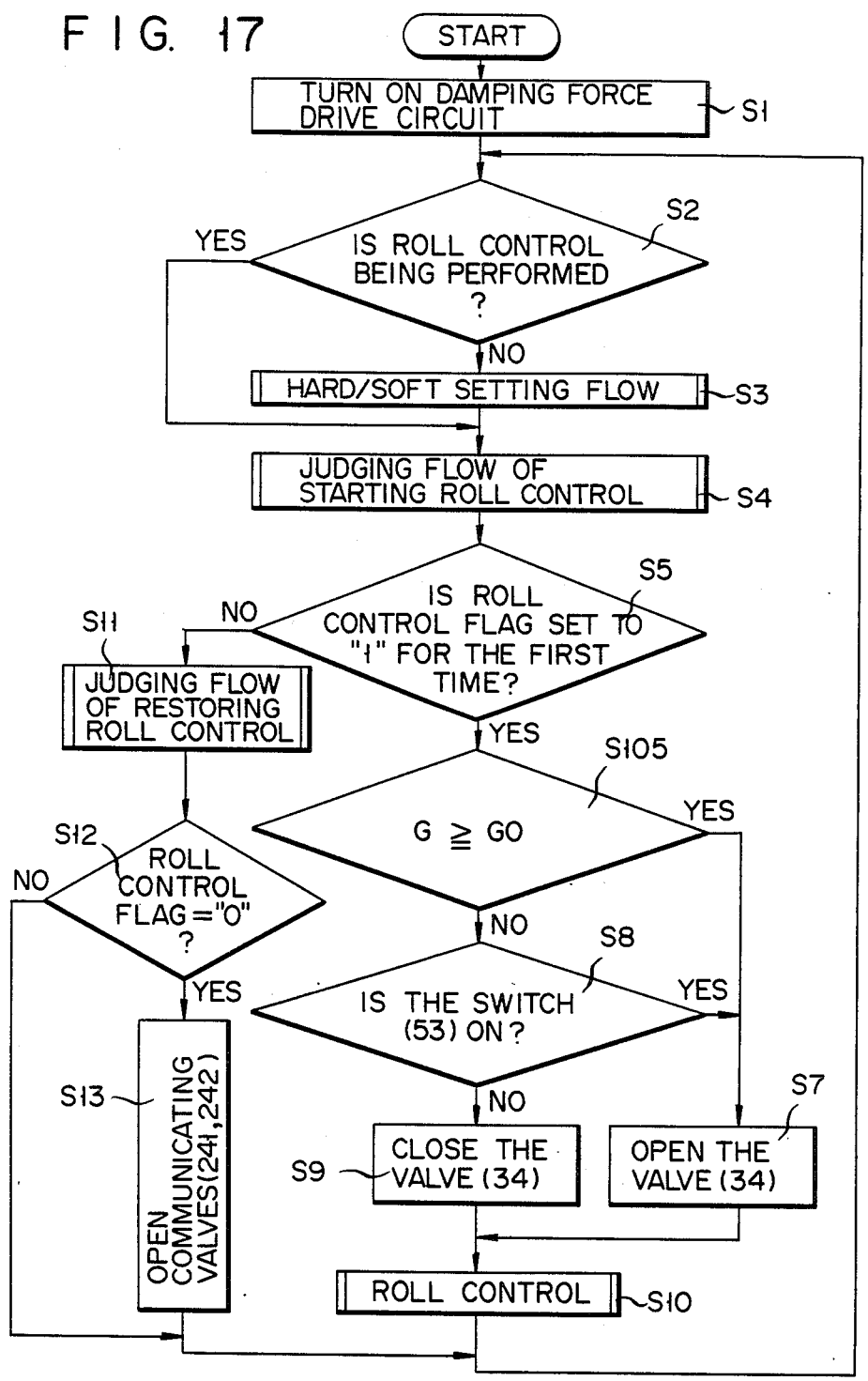
FIG. 17 is a flow chart showing a seventh embodiment.

A seventh embodiment of the present invention will be described in accordance with FIG. 17. The seventh embodiment has fundamentally the same construction as that of the first embodiment except that step S105 is provided instead of step S6 of the flow chart of FIG. 5 in the first embodiment. In the seventh embodiment, a differential transformer type G sensor may be, for example, used to detect the magnitude of the acceleration as the acceleration sensor 44.

In step S105, the flow judges whether the lateral acceleration G detected by the sensor 44 is the preset acceleration $G_0$ or higher or not. If "YES" in step S105, the flow advances to step S7. If "NO" in step S105, the flow advances to step S8.

Therefore, according to the seventh embodiment, the suspension units are switched to the hard state only when the acceleration detected by the acceleration sensor in the case of the roll control is the set acceleration $G_0$ or higher, and the units are switched to the soft state in other cases. According to the seventh embodiment, the units are switched to the hard state only when the wheel 43 is turned and the lateral acceleration at that time is higher.

Figure 18:
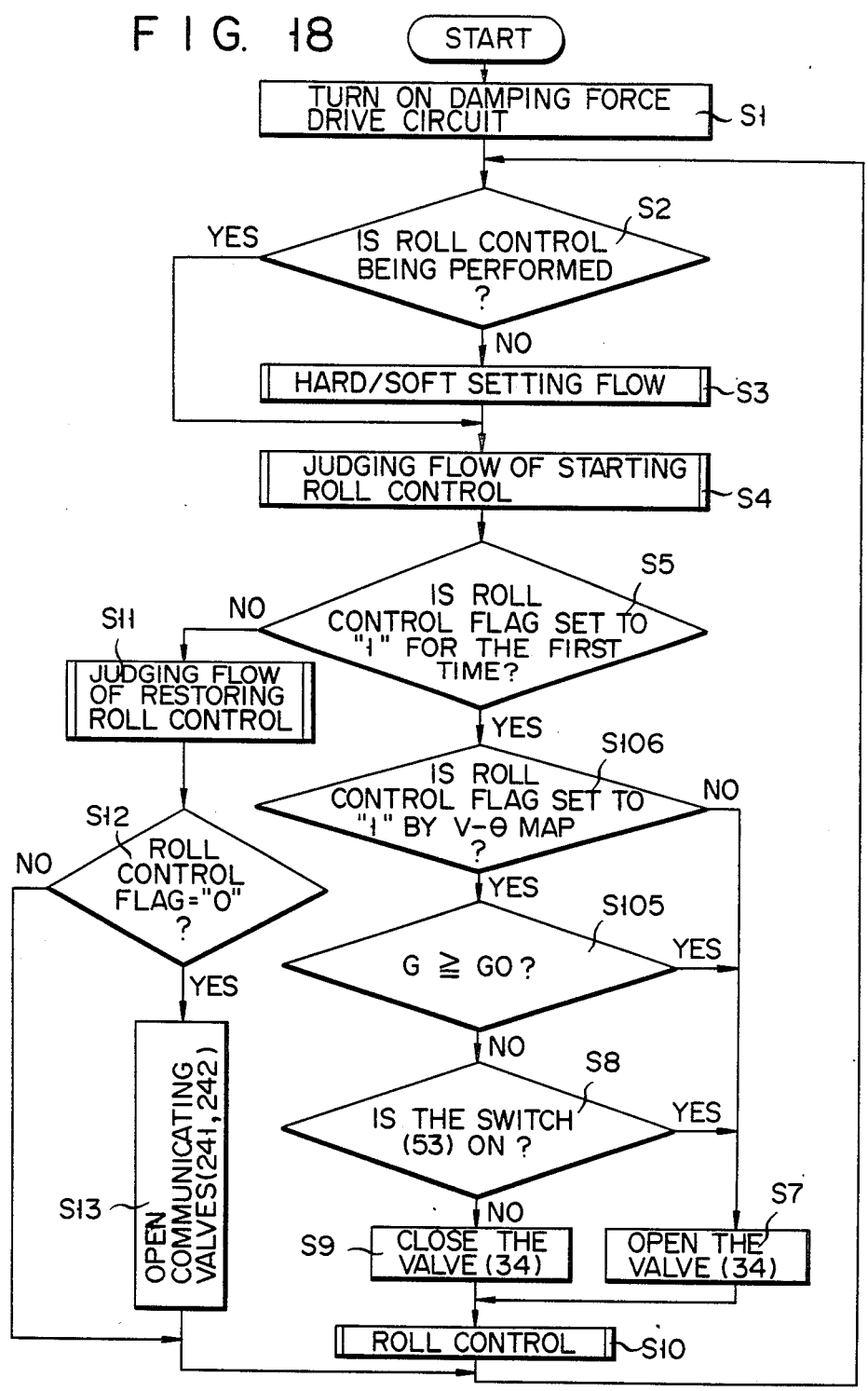
FIG. 18 is a flow chart showing an eighth embodiment.

An eighth embodiment of the present invention will be described in accordance with FIG. 18. The eighth embodiment has fundamentally the same construction as the seventh embodiment except that step S106 is provided between the step S5 and the step S105 of the flow chart of FIG. 17.

In step S106, it is judged whether or not the roll control flag is set by the control area of the vehicle velocity-steering angle map in step S4. If "YES" in step S106, the flow advances to step S105. If "NO" in step S106, the flow advances to step S7.

Therefore, according to the eighth embodiment, the suspension units are switched to the hard state under any condition when the roll control is performed by the control area of the vehicle velocity-steering angular velocity map, and the units are switched to the hard state when the lateral acceleration is the set acceleration $G_0$ or higher if the roll control is performed by the control area of the vehicle velocity-steering angle map, and the units are switched to the soft state except in these cases. According to the eighth embodiment, the units are switched to the hard state in the case of the roll control when the wheel 43 is abruptly turned, and the units are switched to the hard state only when the lateral acceleration at that time is larger in the case of the roll control when the wheel 43 is slowly turned.

Figure 19:
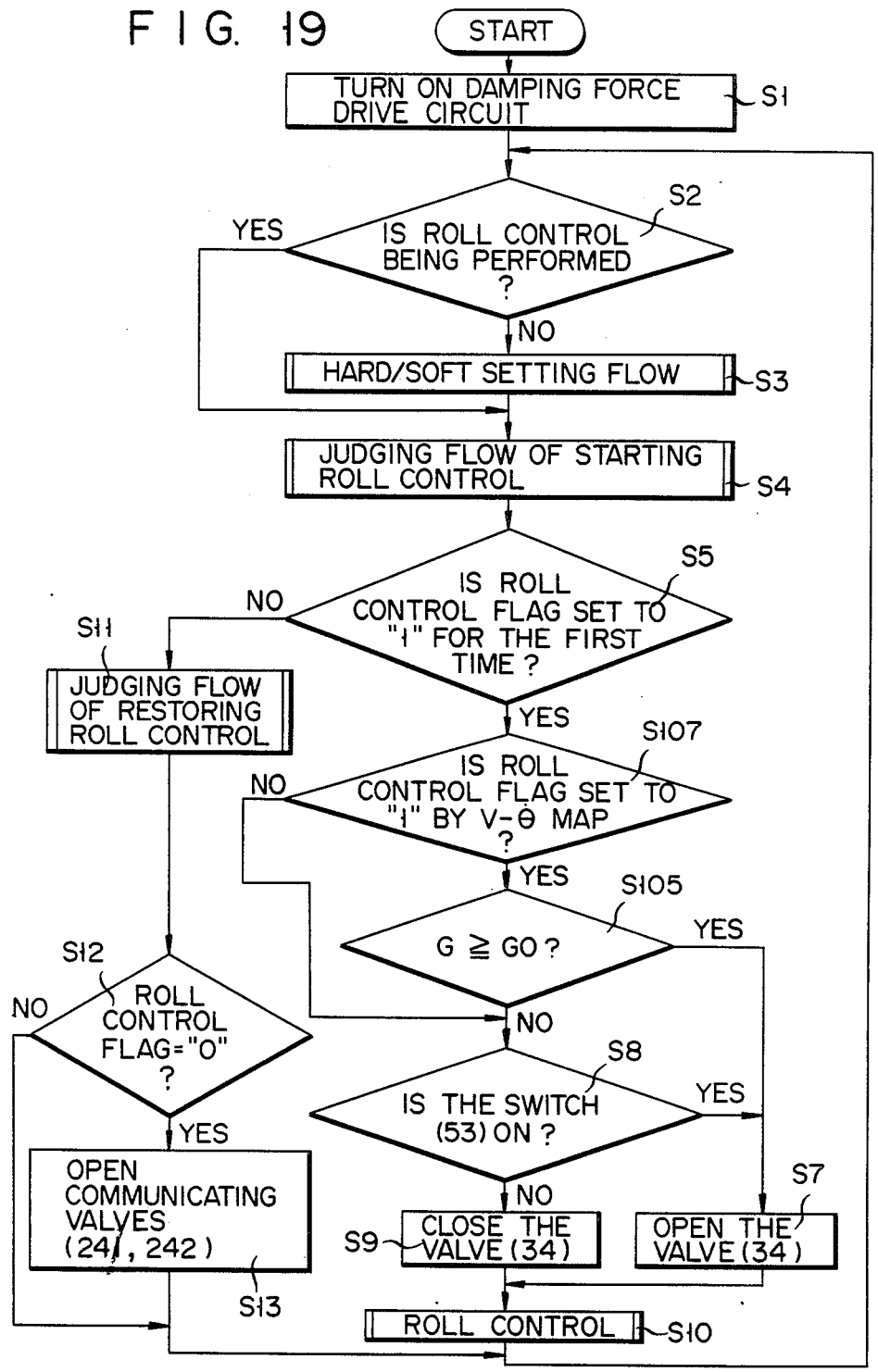
FIG. 19 is a flow chart showing a ninth embodiment.

A ninth embodiment of the present invention will be described in accordance with FIG. 19. The ninth embodiment has fundamentally the same construction as that of the eighth embodiment except that step S107 is provided instead of step S106 of the flow chart of FIG. 18 in the eighth embodiment.

In step S107, it is judged whether or not the roll control flag is set by the control area of the vehicle velocity-steering angular velocity map in step S4. If "YES" in step S107, the flow advances to step S105. If "NO" in step S107, the flow advances to step S8.

Therefore, according to the ninth embodiment, the suspension units are switched to the hard state only when the roll control is performed by the control area of the vehicle velocity-steering angular velocity map and the lateral acceleration is the set acceleration $G_0$ or higher, and switched to the soft state except in these cases. According to the ninth embodiment, the suspension units are switched to the hard state only when the wheel 43 is abruptly turned and the lateral acceleration is high at that time.

Figure 20:
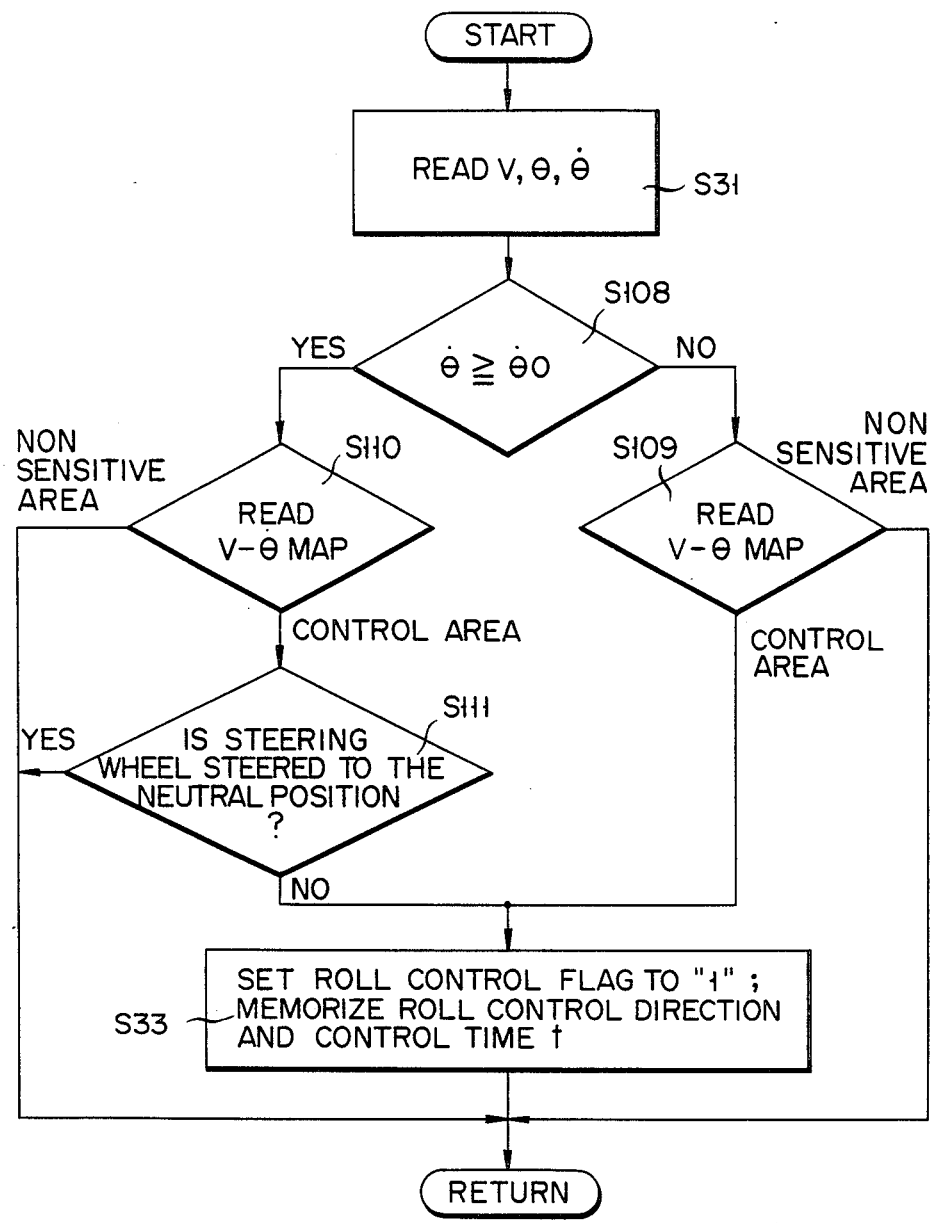
FIG. 20 is a flow chart showing another example of the process of determining the start of the roll control.

A modified embodiment of processing to judge the start of the roll control shown in FIG. 7 is shown in FIG. 20.

In the modified embodiment shown in FIG. 20, the following construction is different from the flow chart shown in FIG. 7. In the modified embodiment, steps S108 to S111 are provided instead of the steps S32, S34 and S35 shown in the flow chart of FIG. 7.

In step S108, the flow judges whether the steering angular velocity $\dot{\theta}$ is the set steering angular velocity $\dot{\theta}_0$ or larger. If "NO" in step S108, the flow advances to step S109. In step S109, the flow judges whether the present vehicle velocity-steering angle falls in the areas I to III or in a non sensitive area in the same map by referring to the vehicle velocity-steering angle map shown in FIG. 8 stored in the controller 36 on the basis of the vehicle's velocity and the steering angle, in the same manner as in the step S32 of the flow chart of FIG. 7.

If the flow is judged, in step S109, to fall in the control areas I to III, the flow advances to step S33. If the flow is judged, in step S109, to fall in the non sensitive area, the flow advances to step S5 of FIG. 5.

On the other hand, if "YES" in step S108, the flow advances to step S110. In step S110, the flow judges whether or not the present vehicle velocity-steering angular velocity falls in the areas I to III in the same map or in the non sensitive area by referring to the vehicle velocity-steering angular velocity shown in FIG. 9. This velocity is stored in the controller 36 on the basis of the vehicle's velocity and the steering angular velocity, in the same manner as the step S34 of the flow chart of FIG. 7.

When the flow judges in step S110 that the velocity falls in the control areas I to III, the flow advances to step S111. In step S111, the flow judges whether or not the steering direction of the steering wheel 43 is directed to the return side, i.e., to neutral position. If "NO" in step S111, the flow advances to step S33. If "YES" in step S111, the flow advances to step S5 in FIG. 5.

Even according to the modified embodiment shown in FIG. 20 as described above, substantially the same advances as those of the flow chart of FIG. 7 can be provided.

In the embodiments described above, the hard/soft setting of the suspension units are switched by both the damping force of the suspension units and the spring constant. However, the present invention may switch only the damping forces of the suspension units, or only the spring constant.

In the embodiments described above, the present invention is applied to the air suspension apparatus utilizing pneumatic pressure. However, the present invention may also be applied, for example, in the same manner to the hydropheumatic type suspension apparatus.

What is claimed is:

1. A vehicle suspension apparatus comprising:
   fluid spring chambers provided at both right and left suspension units;
   fluid supply means for supplying fluid through supply control valves to the fluid spring chambers of the suspension units;
   fluid exhaust means for exhausting the fluid through exhaust control valves from the fluid spring chambers of the suspension units;
   roll detecting means for detecting a roll of a vehicle body;
   roll control means for reducing said roll of the vehicle body by opening the supply control valve for the fluid spring chamber on the compressed side and opening the exhaust control valve for the fluid spring chamber on the elongated side during the set control period of time on the basis of a signal from the roll detecting means;
   hard/soft switching means provided in the suspension units for switching the suspension units to either the hard or soft state;
   running state detecting means for detecting the running state of the vehicle; and
   hard/soft control means for controlling the hard/soft switching means so that the suspension units become soft when the running state detected by the running state detecting means satisfies the set condition and controlling the hard/soft switching means so that the suspension units become hard when the running state does not satisfy the conditions.

2. An apparatus according to claim 1, wherein said running state detecting means comprises a vehicle velocity sensor for detecting the vehicle's velocity,
   said hard/soft control means controls said hard/soft switching means so that said suspension units become soft when the vehicle's velocity, detected by said vehicle velocity sensor, satisfies the condition that it is less than a set velocity, said hard/soft switching means so that said suspension units become hard when the vehicle's velocity does not satisfy said condition.

3. An apparatus according to claim 1, wherein said running state detecting means comprises an acceleration sensor for detecting the lateral acceleration acting on the vehicle body,
   said hard/soft control means controls said hard/soft switching means so that said suspension units become soft when the acceleration, detected by said acceleration sensor, satisfies the condition that it is less than the set acceleration, said hard/soft switching means so that said suspension units become hard when the acceleration does not satisfy the condition.

4. An apparatus according to claim 1, wherein said roll control means comprises control time setting means for setting said control time on the basis of the detection signal of said roll detecting means.

5. An apparatus according to claim 4, wherein said running state detecting means detects the control time set by said control time setting means,
   said hard/soft control means controls said hard/soft switching means so that said suspension units become soft when satisfying the condition that the control time detected by said running state detecting means is less than the set time, said soft/hard switching means so that said suspension units become hard when not satisfying the condition.

6. An apparatus according to claim 4, wherein said roll detecting means comprises:
   steering state detecting means for detecting steering angle and/or steering angular velocity; and
   vehicle velocity detecting means for detecting the vehicle's velocity,
   said control time setting means in said roll control means sets said control time on the basis of the steering angle and/or steering angular velocity detected by said steering state detecting means as well as the vehicle's velocity detected by said vehicle velocity detecting means.

7. An apparatus according to claim 6, wherein said control time setting means in said roll control means comprises:
   first control time setting means for setting said control time on the basis of the steering angle detected by said steering state detecting means and the vehicle's velocity detected by said vechile velocity detecting means; and second control time setting means for setting said control time on the basis of the steering angular velocity detected by said steering state detecting means and the vehicles' velocity detected by said vehicle velocity detecting means.

8. An apparatus according to claim 7, wherein said roll control means sets the control time by said second control time setting means when the control time set by said first control time setting means is zero.

9. An apparatus according to claim 7, wherein said roll control means sets the control time by said first control time setting means when the steering angular velocity detected by said steering state detecting means is less than the set value and sets the control time by said second control time setting means when the steering angular velocity is the set value or higher.

10. An apparatus according to claim 7, wherein said running state detecting means comprises means for detecting that the control time is set by any of said first and second control time setting means of said roll control means, said hard/soft control means controls said hard/soft switching means so that said suspension units become soft when satisfying the condition that the control time setting means detected by said running state detecting means is said first control time setting means and controls said hard/soft switching means so that said suspension units become hard when not satisfying the condition.

11. An apparatus according to claim 7, wherein said running state detecting means comprises:
vehicle velocity sensor for detecting the vehicle's velocity; and
means for detecting that the control time is set by any of said first and second control time setting means of said roll control means,
said hard/soft control means controls said hard/soft switching means so that said suspension units become soft when satisfying the condition that the control time setting means detected by said running state detecting means is said first control time setting means and the detected vehicle velocity is less than the set value, said hard/soft switching means so that said suspension units become hard when not satisfying the condition.

12. An apparatus according to claim 7, wherein said running state detecting means comprises:
vehicle velocity sensor for detecting the vehicle's velocity; and
means for detecting that the control time is set by any of said first and second control time setting means of said roll control means,
said hard/soft control means controls said hard/soft switching means so that said suspension units become soft when satisfying the condition that the control time setting means detected by said running state detecting means is said first control time setting means or the detected vehicle velocity is less than the set value, said hard/soft switching means so that said suspension units become hard when not satisfying the condition.

13. An apparatus according to claim 7, wherein said running state detecting means comprises:
means for detecting that the control time is set by any of said first and second control time setting means of said roll control means; and
means for detecting the control time set by said first or second control time setting means of said roll control means,
said hard/soft control means controls said hard/soft switching means so that said suspension units become soft when satisfying the condition that the control time setting means detected by said running state detecting means is said first control time setting means and the detected control time is less than the set value, said hard/soft switching means so that said suspension units become hard when not satisfying the condition.

14. An apparatus according to claim 7, wherein said running state detecting means comprises:
means for detecting that the control time is set by any of said first and second control time setting means of said roll control means; and
means for detecting the control time set by said first or second control time setting means of said roll control means,
said hard/soft control means controls said hard/soft switching means so that said suspension units become soft when satisfying the condition that the control time setting means, detected by said running state detecting means, is said first control time setting means or the detected control time is less than the set value, said hard/soft switching means so that said suspension units become hard when not satisfying the condition.

15. An apparatus according to claim 7, wherein said running state detecting means comprises:
an acceleration sensor for detecting the lateral acceleration acting on the vehicle body; and
means for detecting that the control time is set by any of said first and second time control means of said roll control means,
said hard/soft control means controls said hard/soft switching means so that said suspension units become soft when satisfying the condition that the control time setting means detected by said running state detecting means is said first control time setting means and the detected lateral acceleration is less than the set value, said hard/soft switching means so that said suspension units become hard when not satisfying the condition.

16. An apparatus according to claim 7, wherein said running state detecting means comprises:
an acceleration sensor for detecting the lateral acceleration acting on the vehicle body; and
means for detecting that the control time is set by any of said first and second time control means of said roll control means,
said hard/soft control means controls said hard/soft switching means so that said suspension units become soft when satisfying the condition that the control time setting means detected by said running state detecting means is said first control time setting means or the detected lateral acceleration is less than the set value, said hard/soft switching means so that said suspension units become hard when not satisfying the condition.

17. An apparatus according to claim 1, further comprising:
hard selection switch, and wherein
said hard/soft control means controls said hard/soft switching means so that said suspension units become hard irrespective of the running state detected by said running state detecting means when receiving a signal from said hard selection switch.

18. An apparatus according to claim 1, wherein said hard/soft control means has a controller having a microcomputer.

19. An apparatus according to claim 1, wherein said hard/soft switching means switches the damping forces of said suspension units.

20. An apparatus according to claim 1, wherein said hard/soft switching means switches the spring forces of said suspension units.

21. An apparatus according to claim 1, wherein said hard/soft switching means switches the spring forces and the damping forces of said suspension units.

* * * * *